United States Patent Office 3,679,621
Patented July 25, 1972

3,679,621
REACTION PRODUCTS OF CARBOXYLIC ACID POLYMERS, ALKYLENIMINES AND ALKYLENE OXIDES
Max Morf, Toms River, Markus Wenger, Beachwood, and Jutta Feisst, Toms River, N.J., assignors to Ciba-Geigy Corporation, Ardsley, N.Y.
No Drawing. Continuation-in-part of application Ser. No. 771,356, Oct. 28, 1969. This application Jan. 28, 1970, Ser. No. 6,643
Int. Cl. C08f 45/24
U.S. Cl. 260—29.6 H         30 Claims

ABSTRACT OF THE DISCLOSURE

New water-soluble to water-dispersible reaction products are provided which are obtained by condensing a carboxylic acid polymer with an alkylenimine and an alkylene oxide. A typical product of the present invention is obtained by condensing a polyacrylic acid with ethylenimine and propylene oxide. The novel condensation products of the present invention have a plurality of utilities. The condensation products of this invention exhibit properties which make them especially useful in paper-making applications as drainage aids, flotation aids, flocculating aids, retention aids, and as wet strength resins.

---

This application is a continuation-in-part of our copending U.S. application Ser. No. 771,356 filed Oct. 28, 1969.

BACKGROUND OF THE INVENTION

Field of the invention

This invention relates to a novel class of reaction products and is more particularly concerned with the reaction products of carboxylic acid polymers with alkylenimines and alkylene oxides, which are useful in paper manufacture.

Description of the prior art

The volume of paper manufactured and the uses for paper have expanded considerably in recent years. Paper is now specifically engineered to have certain properties for each type of application. Additives are included in the paper furnished such as wet strength resins, special fillers, dyes, and so forth, which impart special properties. The increase in the demand for paper and the corresponding increase in competition has required that the paper mills produce paper as efficiently as possible. Improvements in efficiency can be obtained in various ways. The paper-making machine can be speeded up by increasing the drainage rate of the white water from the furnish during formation of the paper on the paper-making machine. Other improvements in efficiency can be achieved by increasing the retention of particulate additives incorporated into certain classes of paper products. The recovery of fines from the white water and the return of the fines to the furnish help to lower the cost of materials.

An additional problem encountered by the paper industry in recent years is pollution control. As is well known, the paper manufacturing processes require huge volumes of water. This water is usually obtained from a natural source such as a river and after use is returned to the same source. The effluent from the paper-making process, unless carefully controlled, can cause serious pollution. The control of pollution is no longer optional with the paper mill, but is required by law in many areas. One of the prime pollutants in paper-making effluent are fines. Accordingly, it is important to remove as large a percentage of the fines as possible from the effluent before it is discharged.

In the prior art various additives have been employed in the paper-making processes to overcome the problem noted above. Certain classes of compounds have been suggested to increase the drainage rate, other compounds were suggested as retention aids, and still other classes of compounds were suggested as wet strength aids. The products heretofore suggested have not been completely satisfactory. Many of the products were pH sensitive, being effective in a relatively narrow pH range, and the improvements were often somewhat marginal.

As paper products became more sophisticated and the paper-making processes became more complex, often a plurality of additives such as those noted above were employed to make given grades of paper. An additional problem was encountered since the various additives employed were not always compatible with each other. Some required different pH conditions to be most effective. Other compounds, because of their chemical structure, would counteract each other.

SUMMARY OF THE INVENTION

A new class of reaction products has been provided which is obtained by reacting a carboxylic acid polymer with an alkylenimine and an alkylene oxide. By selection of appropriate reactants, the reaction products can be used as drainage aids, flotation aids, flocculation aids, retention aids or wet strength resins. The versatility of the class of reaction products included within the scope of the present invention is a distinct advantage. The various embodiments best suited for a given utility can be employed in the presence of each other without any substantial danger of one counteracting the other since they have the same general structure. The reaction products can, of course, be advantageously employed by themselves or in combination with other types of additives.

DESCRIPTION OF THE PREFERRED EMBODIMENTS

The carboxylic acid polymers which are suitable for employment in the present invention are the water-soluble to water-dispersible reaction products of (a) a water-soluble to water-dispersible polymer containing carboxylic acid groups, from $\alpha,\beta$-ethylenically unsaturated carboxylic acids having 3 to 5 carbon atoms; (b) 0.4 to 10 molar equivalents per carboxylic acid group of polymer (a) of at least one alkylenimine having 2 to 4 carbon atoms in the alkyl chain and which may be N-substituted by an alkyl aminoalkyl, hydroxyalkyl group having at most 4 carbon atoms or an acid salt thereof; and (c) 0.4 to 10 molar equivalents per carboxylic acid group of polymer (a) of at least one alkyleneoxide having 2 to 4 caron atoms in the alkyl chain and which may be substituted by a hydroxyl group, an alkoxy group having at most 4 carbon atoms or a benzene radical, or the alkylene oxide grouping may be part of a cyclohexane ring.

The polymers (a) preferably are:

(1) a homopolymer of $\alpha,\beta$-ethylenically unsaturated monocarboxylic acids having 3 to 4 carbon atoms,
(2) a copolymer of different $\alpha,\beta$-ethylenically unsaturated carboxylic acids having 3 to 5 carbon atoms, or
(3) a copolymer of $\alpha,\beta$-ethylenically unsaturated carboxylic acids having 3 to 5 carbon atoms, and another $\alpha,\beta$-ethylenically unsaturated comonomer.

The carboxylic acid groups of polymer (a) are mostly from acrylic or methacrylic acid.

The preferred polymers for employment in this invention are those which are obtained by the homopolymerization of a monocarboxylic acid having 3–4 carbon atoms such as acrylic, or methacrylic acid, or copolymerization of α,β-ethylenically unsaturated carboxylic acids having between 3 and 5 carbon atoms, such as acrylic acid, methacrylic acid, maleic acid, fumaric acid, crotonic acid, and itaconic acid. Particular attention is directed to the carboxylic acid polymers obtained by the homopolymerization of acrylic acid and methacrylic acid.

In addition to the homopolymers and copolymers comprised of only α,β-ethylenically unsaturated carboxylic acid, copolymers of α,β-ethylenically unsaturated carboxylic acid with other types of α,β-ethylenically unsaturated comonomers may also be used. The comonomers which may be employed are, for example, of the acrylic or vinylic type such as esters of acrylic or methacrylic acid, acrylonitrile, acrylamide, vinyl ethers, vinyl esters, styrene, divinyl ether, divinyl sulfone, divinyl sulfide, vinylpyridine, vinylpyrrolidine, vinylchloride and vinylidene chloride. The comonomers may be water-insoluble, or more preferably, water-soluble. It should be noted that mixtures of comonomers of the above-described type can also be used to form the polymer.

Among these copolymers, copolymers of acrylic, methacrylic or maleic acid and an acrylic acid ester, such as ethyl acrylate and especially diethylaminoethylacrylate, a methacrylic acid ester, such as methylmethacrylate, acrylamide, a vinylether such as vinyl ethyl ether, styrene or vinylpyridine deserve special mention.

The molar ratio of the α,β-ethylenically unsaturated carboxylic acid and the comonomer is selected so that the carboxylic acid polymer is water-soluble to water-dispersible and so that there will be sufficient carboxylic acid groups available to form the reaction product. As a general rule, at least fifty mole percent of the monomers employed to form the copolymer should be α,β-ethylenically unsaturated carboxylic acids. However, when the condensation products of this invention are used for certain applications, for example, as flocculating agents, even lesser amounts of the carboxylic acid monomer can be employed, for example, 2–10 mole percent.

The carboxylic acid polymers are obtained by processes well known in themselves. The monomer, if a homopolymer is to be formed, or a mixture of monomers, if a copolymer is to be formed, are heated, preferably in an aqueous medium, with a catalyst such as $K_2S_2O_8$ and $Na_2SO_3$ at slightly elevated temperatures, for example, 40–60° C., until polymerization is completed. The particular reaction conditions required to obtain optimum results will vary somewhat depending on the particular monomer or monomers employed. These conditions, however, are either well known or can readily be determined. It has been found that the carboxylic acid polymers most suitable for employment in the present invention have an intrinsic viscosity in 2 N sodium hydroxide at 25° C. of between 0.30 and 8 dl./g. (deciliters/gram).

The alkylenimines employed in the present invention preferably are represented by the formula (1) 

wherein $R_1$ is a hydrogen atom or an alkyl radical having at most 2 carbon atoms such as methyl and ethyl radicals. The most important alkylenimines for employment in this invention are those in which $R_1$ is hydrogen.

The group $R_2$ of Formula 1 is advantageously hydrogen and also represents an alkyl, hydroxy alkyl or amino alkyl radical having at most 3 carbon atoms for example, methyl, ethyl, isopropyl, 2 amino-ethyl and 3-hydroxy-n-propyl radicals. The alkyleneimines described above are well known or can readily be prepared by methods well known in themselves. The preferred alkylenimine for employment in the present invention is ethylenimine. It should also be noted that mixtures of different alkylenimines of the type described above may also advantageously be employed in the present invention.

The alkylene oxides which are preferably employed in the present invention as component (1) are represented by the formula (2) 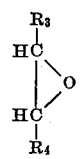

in which $R_3$ is a hydrogen atom, an alkyl radical having at most 2 carbon atoms, a hydroxyalkyl radical having at most 2 carbon atoms, an alkoxy radical having at most 4 carbon atoms or a phenyl radical, $R_4$ is a hydrogen atom or together with $R_3$ is an n-butylene radical.

Component (c) thus e.g. may be cyclohexane oxide, styrene oxide, n-butyl glycidyl ether, 1,2-butylene oxide, preferably ethylene oxide and especially propylene oxide.

Suitable reaction products from components (a), (b) and (c) are e.g. made from polyacrylic acid, ethylenimine and propylene oxide or from an acrylic acid-acrylamide copolymer, ethylenimine and propylene oxide. It is advantageous to use approximately 1 molar equivalent of ethylenimine and 1 to 2 molar equivalents of propylene oxide.

The reaction products of this invention are obtained by condensing the carboxylic acid polymer (a) with the alkylenimine (b) and the alkylene oxide (c). The basic procedure which can be employed to manufacture the reaction products is shown in the formula below.

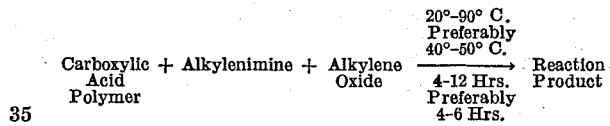

The relative amounts of the alklenimine and alkylene oxide reactants are calculated on the number of carboxylic acid groups present in the carboxylic acid polymer. The number of carboxylic acid groups present in the carboxylic acid polymer can readily be determined from a consideration of the amounts and types of monomers employed to make the polymer. It is preferred to have at least 0.4 and up to 10 molar equivalent of each of the alkylenimines and the alkylene oxides for each carboxylic acid group of the carboxylic acid polymer.

While it is preferable to use single alkylenimines or alkylene oxides to make the product of the present invention, blends of alkylenimines or alkylene oxides can advantageously be employed. For example, blends of propylene oxide and ethylene oxide can be used as the alkylene oxide reactant.

The reaction is preferably conducted in an aqueous medium. The amount of water employed is advantageously selected so that the final product will contain about 5–50% of the reaction product of this invention. The low molecular weight reaction products can be prepared in a higher concentration, e.g. up to 50% solid, while the higher molecular weight reaction products are prepared in a lower concentration.

The exact structure of the polymerization products of the present invention has not been definitely ascertained. It is believed, however, that the alkylenimine reacts with the carboxylic acid group of the carboxylic acid polymer and the alkylene oxide reactant reacts with the alkylenimine residue and the remaining unreacted carboxylic acid group.

The initial step in the manufacture of the reaction products of this invention is the polymerization of the monomer to form the carboxylic acid polymer, which was described above. The alkylenimine and alkylene oxide are added in any desired sequence to an aqueous solution or dispersion of the carboxylic acid polymer. The addition may be step-wise or the addition of the alkylenimine and alkylene oxide may be made simultaneously. In a step-wise addition it is preferred to add component (b) first and then (c). The aqueous mixture of the carboxylic acid polymer, the alkylenimine and the alkylene oxide usually is then heated to about 20 to 90° C., more preferably 40 to 50° C., and maintained at this temperature for 4 to 12 hours, preferably 4 to 6 hours. When the carboxylic acid polymer is first reacted with the alkylene oxide (c) and afterwards with the alkylenimine (b), it is advantageous to use component (b) in the form of an ammonium salt, e.g. as perchlorate. It is also possible to react components (b) and (c) first and in a second step with polymer (a).

The useful pH range of the product of the present invention can be expanded by reacting a sufficient amount, of the alkylenimine and alkylene oxide reactants to convert substantially all of the carboxylic acid group to the ester form. If this is not feasible because the particular product which is to be formed required only 0.4 to one molar equivalent per carboxylic acid group of the alkylenimine, for example, the remainder of the carboxylic acid can readily be converted by an aftertreatment with an alkylene oxide of the type described above, for example, ethylene oxide, butylene oxide or styrene oxide.

The reaction products of the present invention are added at various places in the paper-making process, depending on the intended utility of the product. When the product is to be used as a drainage aid or retention said, it is preferably added to the stock immediately before the stock is fed onto the paper machine wire, for example, at the head box or at the fan pump. Wet strength agents can be added at any place before the paper sheet is formed, for example, in the pulper or beater, at the fan pump or at the head box. When a reaction product of this invention is used for separation of fines or as flotation aids, the product is preferably added to the white water as it is processed for recycling to the paper machine or discharged. The amount of product that is added is dependent to a large degree on the particular type of furnish that is being processed, the function of the reaction product, and the amount of improvement desired. The reaction products of this invention are generally most effective when amounts equivalent to 1–20 pounds per ton of paper furnish are used.

The following examples will enable those skilled in the art to practice the invention and illustrate the present invention but are not to be construed as limiting the scope of the present invention. The parts and percentages noted, unless otherwise indicated, are parts and percentages by weight.

EXAMPLE 1

72 g. of 10% aqueous solution of a polyacrylic acid having an intrinsic viscosity of 3.6 dl./g. in 2 N sodium hydroxide was diluted with 143 g. of water. The mixture was heated to 40° C. and 4.3 g. of ethylenimine and 11.6 g. of propylene oxide were added simultaneously. The resulting mixture was heated to and maintained at 40–45° C. for 5 hours and then acidified with 3 g. of 37% hydrochloric acid. A yield of 234 g. of a slightly yellow clear solution was obtained having a Gardner viscosity of P at 25° C.

EXAMPLE 2

The procedure described in Example 1 was repeated with the exception that the ethylenimine was added initially and about 5 minutes later the propylene oxide was added. No difference was noted in the resulting product.

EXAMPLE 3

The procedure described in Example 1 was repeated with the exception that a polyacrylic acid having an intrinsic viscosity of 7.2 dl./g. in 2 N sodium hydroxide at 25° C. was employed.

EXAMPLE 4

The procedure described in Example 1 was repeated with the exception that a polyacrylic acid having an intrinsic viscosity of 5.0 dl./g. in 2 N sodium hydroxide at 25° C. was employed.

EXAMPLE 5

The procedure described in Example 1 was repeated with the exception that a polyacrylic acid having an intrinsic viscosity of 3.1 dl./g. in 2 N sodium hydroxide at 25° C. was employed.

EXAMPLE 6

The procedure described in Example 1 was repeated with the exception that a polyacrylic acid having intrinsic viscosity of 2.05 dl./g. in 2 N sodium hydroxide at 25° C. was employed.

EXAMPLE 7

The procedure described in Example 1 was repeated with the exception that a polyacrylic acid having an intrinsic viscosity of 1.56 dl./g. in 2 N sodium hydroxide at 25° C. was employed.

EXAMPLE 8

The procedure described in Example 1 was repeated with the exception that a polyacrylic acid having an intrinsic viscosity of 0.66 dl./g. in 2 N sodium hydroxide at 25° C. was employed.

EXAMPLE 9

The procedure described in Example 1 was repeated with the exception that a polyacrylic acid having an intrinsic viscosity of 0.44 dl./g. 2 N sodium hydroxide at 25° C. was employed.

EXAMPLE 10

A mixture of 20 g. of methacrylic acid, 180 g. of distilled water, 2.5 ml. of 5% solution of $K_2S_2O_8$ and 0.25 ml. of a 5% solution of $Na_2SO_3$ were heated at 40–45° C. for 3 hrs. 86 g. of the above solution was blended with 103 g. of water, 5.2 g. of ethylenimine and 11.6 g. of propylene oxide. This mixture was heated to 45° C. and held at this temperature for 6 hours. The product was a slightly yellow solution having 10.1% solids.

EXAMPLE 11

6.6 g. of a 1:1-copolymer of vinylethyl ether and maleic anhydride having an intrinsic viscosity of 2.8 dl./g. in methyl-ethyl ketone at 25° C. was hydrolyzed at 90° C. in 196.7 g. water. The solution was cooled to 40° C. and 3.6 g. of ethylenimine and 2.8 g. of propylene oxide charged into the solution. The mixture was heated and maintained at 40–45° C. for 4 hours. The batch was cooled to 10° C. and 1.85 g. ethylene oxide were added and the batch was raised to 40° C. and maintained at this temperature for an additional two hours. The batch was cooled and acidified with 2 g. of 37% hydrochloric acid. 215 g. of a slightly cloudy water-soluble gel having 7.35% solids was obtained.

EXAMPLE 12

7.2 g. of acrylic acid and 4.8 g. acrylamide were copolymerized in 108 g. water using 5 mg. $K_2S_2O_8$ and 5 mg. $Na_2SO_3$ as catalysts at 40° C. for 2 hours. The copolymer thus obtained was diluted with 143 g. water and the temperature adjusted to 40° C. 4.38 g. of ethylenimine and 11.6 g. of propylene oxide were charged and the batch maintained at 40–45° C. for 5 hours and then acidified with 5 g. of 37% hydrochloric acid. A cloudy product was obtained in the form of a water-soluble gel.

EXAMPLE 13

11.9 g. of diethylaminoethylacrylate quaternized with dimethyl sulfate and 11.5 g. acrylic acid were copolymerized in 210 g. water in the presence of .5% $K_2S_2O_8$ and 0.5% $Na_2SO_3$ at 45° C. 117 g. of this copolymer solution was diluted with 117 g. of water. To this mixture was added 3.45 g. of ethylenimine and 9.3 g. of propylene oxide and the mixture was heated to 40–45° C. for 5 hours.

240 g. of a cloudy water-soluble viscous solution was obtained.

EXAMPLE 14

86 g. of a 10% polymethacrylic acid solution having an intrinsic viscosity of 0.7 dl./g. in 2 N NaOH at 25° C. was diluted with 163.9 g. water. The temperature was raised to 40° C. and 4.3 g. ethylenimine and 11.6 g. propylene oxide were charged from a dropping funnel. The batch was maintained at 45° C. for 3 hours, and then it was cooled to 10° C. 2.2 g. of ethylene oxide was introduced and the temperature was raised to 40° C. within ½ hour and maintained there for 3 hours. 265 g. of a clear slightly yellow solution of a solids content of 7.85% was obtained having a Gardner viscosity of A at 25° C. and a pH of 6.8.

EXAMPLE 15

The process described in Example 14 was repeated with the exception that a polyacrylic acid polymer having an intrinsic viscosity of 1.6 dl./g. in 2 N sodium hydroxide was employed.

EXAMPLE 16

9.8 g. of an acrylic acid styrene copolymer containing 20 mole percent of styrene are dispersed in 251.1 g. water. 4.3 g. ethylenimine and 11.6 g. propylene oxide are added simultaneously at 40° C. and the temperature of the resulting mixture is maintained at 40–45° C. for 4 hours. The batch is then cooled to 10° C. and 2.2 g. ethylene oxide was introduced and the temperature was raised to 45° C. within ½ hour. The batch was held at 45° C. for 4 hours and then acidified with 6 g. glacial acetic acid. 270 g. of a slightly cloudy solution of a solids content of 7.15% was obtained having a Gardner viscosity of A and a pH of 4.5 in a 1% solution.

EXAMPLE 17

10.5 g. 4-vinylpyridine and 7.2 g. acrylic acid were copolymerized in 53.1 g. water using 50 mg. $K_2S_2O_8$ as catalyst at 55° C. for 3 hours. The copolymer thus obtained was diluted with 281.7 g. water and acidified with 6 g. glacial acetic acid. The temperature was adjusted to 40° C. and 4.3 g. ethylenimine and 11.6 g. propylene oxide were charged and the batch maintained at 45–50° C. for 6 hours. 3.6 g. 1–2 butylene oxide are introduced and the batch was kept at 45–50° C. for 3 hours. 376 g. of a brownish solution of a solids content of 8.2% was obtained.

EXAMPLE 18

72 g. of a 10% polyacrylic acid having an intrinsic viscosity of 3.1 dl./g. in 2 N sodium hydroxide was diluted with 116 g. of water. The temperature was raised to 40–45° C. and 7.19 g. of N-ethylaziridine and 5.8 g. of propylene oxide were added. The batch was maintained at 45° C. for 6 hours and then acidified with 5 g. of 37% hydrochloric acid. A yellowish viscous solution was obtained.

EXAMPLE 19

The above procedure was repeated with the exception that 8.6 g. N-aminoethylaziridine and 11.6 g. propylene oxide were employed.

EXAMPLE 20

The procedure in Example 18 was repeated with the exception that 8.7 g. of N-ethanolaziridine was employed.

EXAMPLE 21

72 g. (0.1 mole acrylic acid monomer) of a 10% polyacrylic acid having an intrinsic viscosity of 3.6 dl./g. in 2 N sodium hydroxide was diluted with 72 g. of water. The temperature was raised to 40° C. and 1.7 g. (40 mmoles) ethylenimine were added and the batch heated to 40–45° C. for 3 hours. 2.3 g. (40 mmoles) of propylene oxide were added and the batch heated again to 40° C. and maintained at this temperature until 6 hours had elapsed. The batch was then acidified with hydrochloric acid to a pH of 4.0.

EXAMPLE 22

11.35 g. (50 mmoles acrylic acid monomer) of a 31.6% polyacrylic acid solution having an intrinsic viscosity of 0.44 dl./g. in 2 N sodium hydroxide at 25° C. were diluted with 322 g. water. The temperature was raised to 40–45° C. and 21.5 g. (0.5 mole) ethylenimine and 11.6 g. (0.2 mole) propylene oxide were added. The batch was heated for 5 hours at 40–45° C. 360 g. of a clear yellowish solution was obtained.

EXAMPLE 23

232 g. of a 3.1% polyacrylic acid solution having an intrinsic viscosity of 4.0 dl./g. in 2 N sodium hydroxide was cooled to 10° C. 4.3 g. of ethylenimine and 8.8 g. of ethylene oxide were added. The temperature was raised to 40° C. over 1 hour and the batch maintained at this temperature for about 5 hours. The batch was diluted with 1.5 liters of water and acidified with 5 g. of 37% hydrochloric acid. 1740 g. of a clear gel having 0.97% solids content was obtained which in further dilution went in solution.

EXAMPLE 24

74.5 g. of a 9.7% polyacrylic acid solution having an intrinsic viscosity of 2.8 dl./g. in 2 N sodium hydroxide at 25° C. and 164 g. of water were heated to 45–50° C. 4.3 g. of ethylenimine and 14.2 g. of 1,2-butylene oxide were added over a three minute period. The batch was held at 45–50° C. for 6 hours and then acidified with 5 g. of 37% hydrochloric acid. 251 g. of a cloudy product was obtained having 7.25% solids content and a Gardner viscosity of A at 25° C. and a pH of 5.9 in a 1% solution.

EXAMPLE 25

74.5 g. of 9.7% polyacrylic acid solution having an intrinsic viscosity of 2.84 dl./g. in 2 N sodium hydroxide was diluted with 252 g. of water and 4.3 g. of ethylenimine and 24 g. styrene oxide were added. The batch was heated to 40–45° C. and maintained at this temperature for 6 hours. The batch was acidified with 5 g. 37% hydrochloric acid and diluted with an additional 200 g. of water. 450 g. of a cloudy product was obtained containing a small amount of a water-insoluble precipitate.

EXAMPLE 26

3.7 g. of ethylenimine and 10.05 g. of propylene oxide were added to 216 g. of a 2.5% polyacrylic acid solution having an intrinsic viscosity of 7.2 dl./g. in 2 N sodium hydroxide at 25° C. while holding the temperature between 15 and 20° C. The batch was then held at 20° C. for 12 hours and acidified with 3 g. of 37% hydrochloric acid. 225 g. of a clear gel was obtained having a 6.7% solids content.

EXAMPLE 27

72 g. of a 10% polyacrylic acid solution having an intrinsic viscosity of 3.3 dl./g. in 2 N sodium hydroxide at 25° C. was diluted with 143 g. of water. The temperature was raised to 90° C. and 4.3 g. of ethylenimine was added. A quarter of an hour later 11.6 g. of propylene oxide were added. The batch was held at 90° C. for 5 hours and then acidified with 5 g. of 37% hydrochloric acid. 233 g. of a cloudy slightly yellow solution having a pH of 4.2 and 8.95% solids content was obtained.

EXAMPLE 28

232 g. of 3.1% polyacrylic acid solution having an intrinsic viscosity of 4.0 dl./g. in 2 N sodium hydroxide at 25° C., 4.3 g. ethylenimine and 11.6 g. propylene oxide are heated for 3 hours at 40–45° C. and then cooled to 10° C. 2.2 g. of ethylene oxide are then added and heated to 40° C. and held at this temperature for an additional 2 hours. The batch is acidified with 3 g. 37% hydrochloric acid. 250 g. of a slightly yellow clear solution having 6.8% solids content and a Gardner viscosity less than A in a 1% solution is obtained.

EXAMPLE 29

74.5 g. of a 9.65% polyacrylic acid solution having an intrinsic viscosity of 3.4 dl./g. in 2 N sodium hydroxide at 25° C. is diluted with 140 g. of water. The batch is heated to 40° C. and 4.3 g. ethylenimine and 11.6 g. propylene oxide are added. The batch is then held at 45° C. for 5 hours. The batch was then after-treated by adding 3.6 g. of 1,2-butylene oxide and heated for 7 hours at 40–45° C. The batch was then acidified with 3 g. 37% hydrochloric acid. 235 g. of a slightly cloudy solution having 8.7% solids contents, a Gardner viscosity of B–C and a pH of 5.7 in a 1% solution at 25° C. was obtained.

EXAMPLE 30

Example 29 was repeated with the exception that a polyacrylic acid solution having an intrinsic viscosity of 0.44 dl./g. in 2 N sodium hydroxide was employed.

EXAMPLE 31

232 g. of a 3.1% polyacrylic acid solution having an intrinsic viscosity of 4.0 dl./g. in 2 N sodium hydroxide was heated to 45° C. 4.3 g. of ethylenimine and 11.6 g. of propylene oxide were added. The batch was maintained at 45° C. for 3 hours. Then 4.9 g. of cyclohexane oxide was added and the temperature was raised to 60° C. for 21 hours. The batch was acidified with 3 g. 37% hydrochloric acid. 252 g. of a cloudy solution was obtained having 8.7% solids content and a Gardner viscosity of C and a pH of 5.2 at 25° C. in a 1% solution.

EXAMPLE 32

344 g. of a 10% polymethacrylic acid solution having an intrinsic viscosity of 1.6 dl./g. in 2 N sodium hydroxide are placed in a resin kettle. The temperature was raised to 40° C. and 17.2 g. ethylenimine and a mixture of 11.6 g. propylene oxide and 8.8 g. ethylene oxide were added simultaneously. The batch was maintained at 40–45° C. for 3 hours. 12 g. glacial acetic acid and a mixture of 11.6 g. propylene oxide and 8.8 g. ethylene oxide were introduced and the batch was held for 3 hours at 45° C. 14.4 g. of 1–2 butylene oxide are charged and the resulting mixture was reacted for 4 hours at 45° C. and then acidified with 12 g. glacial acetic acid. 440 g. of a slightly cloudy yellowish solution of a solids content of 20.5% was obtained having a Gardner viscosity of B at 25° C. and a pH of 5.4 in a 1% solution.

EXAMPLE 33

344 g. of a 10% polymethacrylic acid solution was placed in a resin kettle and the temperature was raised to 40° C. 17.2 g. ethylenimine and 23.2 g. propylene oxide are charged simultaneously and the batch was maintained for 3 hours at 40–45° C. 9.8 g. sulfuric acid conc. and 23.2 g. propylene oxide were introduced and the batch was held for 3 hours at 45° C. 14.4 g. 1–2 butylene oxide are added and the resulting mixture was reacted at 45° C. for 4 hours and then acidified with 9.8 g. sulfuric acid conc. 440 g. of a clear solution of a solids content of 23.5% was obtained having a Gardner viscosity of less than A at 25° C. and a pH of 2.4 in a 1% solution.

EXAMPLE 34

The above example was repeated with the exception that 13 g. phosphoric acid conc. were substituted for sulfuric acid conc. The product obtained was a clear solution having a Gardner viscosity of less than A at 25° C. and a pH of 4.2 in a 1% solution.

EXAMPLE 35

72 g. of a 10% polyacrylic acid solution having an intrinsic viscosty of 4.0 dl./g. in 2 N sodium hydroxide at 25° C. was diluted with 272.7 g. of water. The temperature was raised to 40° C. and 4.3 g. ethylenimine and 26 g. n-butylglycidyl ether were added. The batch was held at 40–45° C. for 8 hours and then diluted with 3.0 liters of water and acidified with 9.8 g. 37% hydrochloric acid. 3380 g. of a viscous, yellowish solution was obtained having a solids content of 0.85%.

EXAMPLE 36

Certain selected reaction products produced in Examples 1–30 were evaluated as drainage aids. The test was conducted on a laboratory scale paper machine wherein the distance of the wire from the slice to the couch was about 62″. The test furnish was comprised of 20% bleached sulfite and 80% ground wood and had a Canadian standard freeness of 150. The furnish was separately adjusted for pH and the products were added at the fan pump. The evaluation was made by measuring the distance from the slice to the water line. The water line is that point on the paper machine wire where the furnish loses its liquid shine and assumes a dull, almost dry looking, appearance. The results are reported below in Table I.

TABLE I.—EFFECT OF THE REACTION PRODUCTS ON THE ADVANCEMENT OF THE WATER LINE

| Product described in Example No. | Waterline (inches) | | | |
|---|---|---|---|---|
| | pH 5 | pH 7 | pH 8 | Blank |
| 3 | 15 | 16 | 27 | 45–48 |
| 5 | 20 | 26 | 44 | 43–49 |
| 8 | 26 | 35 | 45 | 43–49 |
| 11 | | 13 | 18 | 44 |
| 13 | | 24 | 27 | 48 |
| 14 | | 26 | 32 | 48 |
| 18 | 17 | 26 | 42 | 46 |
| 21 | 24 | 32 | | 48 |
| 23 | | 16 | 27 | 48 |
| 28 | | 17 | 22 | 44 |
| 29 | | 17 | 19 | 44 |

EXAMPLE 37

200 cc. of bleached kraft fines were shaken with 0.4 p.p.m. with selected reaction products formed in Examples 1–30 at an air pressure of 20 p.s.i. This solution was then poured in a separating funnel where the fines were allowed to float to the tip of the solution. After a rest period, the lower liquor was removed and evaluated against the standard solution containing known amounts of fines. In addition, a commercially available polyacrylamide product was evaluated for this purpose and was tested under the identical conditions. The result of the polyacrylamide should be compared closely with the results obtained with acrylic acid acrylamide reaction products formed in Example 12.

TABLE II

Effect of the reaction products on the flotation rate of bleached kraft fines

| Product described in Example No.: | Percent fines in white water after flotation |
|---|---|
| Blank | 100 |
| 12 | 10–20 |
| 23 | 30 |
| 24 | 30 |
| 31 | 30 |
| Polyacrylamide | 80 |

EXAMPLE 38

2.5 g. hand sheets were prepared from furnish consisting of bleached kraft fines and selected reaction products of this invention. The reaction products were added in an amount equivalent to 20 lb. per ton of furnish. The sheets were made in a Williams sheet mold, pressed and dried. The sheets were cured for 10 minutes at 266° F. and conditioned for 24 hours at 50% RH and 73° F. For purposes of comparison, samples were prepared with a polyamide-epichlorohydrin reaction product previously suggested for this use. Dry and wet tensile strengths were tested according to TAPPI standard numbers T 456–49 and T 409–99.

Table III

TABLE III.—EFFECT OF THE REACTION PRODUCTS ON THE WET-STRENGTH

| Product described in example No.: | Wet-strength, percent of dry-strength | Dry-strength, lbs./inch |
|---|---|---|
| 12 | 30 | 34.8 |
| 26 | 15 | 21.8 |
| Polyamide-epichlorohydrin condensation product | 27 | 25.3 |

EXAMPLE 39

A fiber furnish containing 90 parts of bleached sulfite cellulose at 400 Canadian standard freeness and 10 parts titanium dioxide was run on a laboratory paper machine at pH 5–5.5. The addition of selected reaction products described in Examples 1–30 was made at the head box at dosage levels of 1/8, 1/4 and 1/2 lbs./ton of dry fiber furnish. The $TiO_2$ retention aid performance of the products was determined according to TAPPI standard procedure T 413 ts–66.

TABLE IV.—PERCENT TITANIUM DIOXIDE RETENTION

| Product described in example No.: | Percent $TiO_2$ retention | | |
|---|---|---|---|
| | 1/8 lb. prod./ ton furnish | 1/4 lb. prod./ ton furnish | 1/2 lb. prod./ ton furnish |
| 9 | 75 | 78 | 81 |
| 14 | 54 | 74 | 78 |
| 15 | 61 | 75 | 81 |
| 24 | 31 | 78 | 81 |
| 29 | 39 | 81 | 82 |
| 30 | 30 | 55 | 78 |
| Blank | 12 | 12 | 12 |

EXAMPLE 40

To 650 ml. of an aqueous polymethacrylic acid solution (described below), the mixture of 4.3 g. ethylenimine and 5.7 g. propylenimine is added during 20 minutes simultaneously with 11.6 g. propylene oxide while stirring and keeping the temperature at 45° C. for three hours. Hereupon, 6 g. glacial acetic acid are added, followed by another 11.6 g. propylene oxide and the mixture is further stirred at 45° C. for three hours. Now 7.2 g. 1,2-butylene oxide are added during 15 minutes and the mixture stirred at 45° for four hours. Finally, another 6 g. glacial acetic acid are added while cooling, to yield a clear, slightly viscous solution.

The starting material is prepared as follows: to the stirred solution of 17.2 g. methacrylic acid (containing 0.1% monomethoxy-hydroquinone) in 149.5 ml. water, 0.85 g. sodium sulfate, 0.2 ml. 2 N aqueous sodium hydroxide and 0.5 g. polypropylene glycol (molecular weight 1025) are added and the mixture is heated over 1/2 hour to 70° C. under nitrogen. Hereupon, the solution of 0.0069 g. sodium sulfite in 10 ml. water is added, followed by that of 0.069 g. potassium persulfate in 10 ml. water and the temperature is maintained at 70° C. for two hours. Hereupon, the mixture is diluted with water to yield a final volume of 650 ml.

EXAMPLE 41

The procedure described in Example 40 is repeated with the exception that the 5.7 g. propylenimine are replaced by the 7.1 g. 1,2-butylenimine, to yield a slightly hazy, less viscous solution.

EXAMPLE 42

To 340 ml. of an aqueous polymethacrylic acid solution (prepared analogously as described in Example 40, with the exception that 0.0103 g. sodium sulfite and 0.1032 g. potassium persulfate were used), 8.6 g. ethylenimine are added simultaneously with 5.9 g. 2,3-epoxy-1-propanol during 10 minutes while stirring under nitrogen at 45° C. and this temperature is maintained for two hours. Hereupon, 18 g. glacial acetic acid are added, to yield a slightly cloudy, viscous solution.

EXAMPLE 43

To 360 ml. of an aqueous polyacrylic acid solution (described below), 215 g. of an aqueous N-(2-propanol)-aziridine solution (described below) are added during three hours at 45–55° C. while stirring under nitrogen. Hereupon, the temperature is held at 55° C. for 8 hours. Then, 10.2 g. concentrated hydrochloric acid are added and the mixture stirred for 1½ hours at 55°, to yield a greenish-yellow viscous solution.

The starting materials are prepared as follows:

(a) To the solution of 36 g. acrylic acid (containing 0.5% monomethoxy-hydroquinone) in 324.3 g. water, 0.4324 g. potassium persulfate and 0.0432 g. sodium sulfite are added at 40° C. while stirring under nitrogen and the temperature is maintained for 2½ hours at 40°–45° C.

(b) 29 g. 1,2-propylene oxide are added to the solution of 21.5 g. ethylenimine in 165.9 g. water during 45 minutes at 25° C. under nitrogen and the mixture stirred for ½ hour.

EXAMPLE 44

To 280 ml. of the aqueous polyacrylic acid solution described in Example 30, 14.5 g. 1,2-propylene oxide are added during 15 minutes at 30° C. under nitrogen. The mixture is stirred for one hour at this temperature and two hours at 45° C. and diluted with 116.2 ml. water. Thereupon, an aqueous solution of aziridinium perchlorate (described below) is added during one hour at 45° C. while stirring under nitrogen and this temperature is maintained for four hours, to yield a pale yellow, slightly viscous solution.

The starting material is prepared as follows: To the solution of 10.81 g. ethylenimine in 100 ml. water, 35.9 g. of 70% aqueous perchloric acid are added during 1½ hours at 25° C. while stirring and cooling. The resulting solution is being used within 24 hours. The same applies for the other starting materials described in Examples 40–43.

EXAMPLE 45

The products of the invention can be evaluated as drainage aids as follows: 400 ml. of a 1% groundwood pulp suspension (having a Canadian standard freeness of 150) and 400 ml. of a 0.001% aqueous test solution placed in two separate beakers and their pH is adjusted to the same value with either hydrochloric acid or aqueous sodium hydroxide. The test solution is then added during one minute to the pulp suspension and the mixture stirred for a total of five minutes. It is filtered through a suction funnel containing one sheet Whatman No. 4 filter paper. The time is measured from the moment of pouring the pulp into the funnel to the instant when the vacuum has dropped by 10 mm. Hg. Typical figures obtained from pulp suspension alone are in the order of 600–1000 seconds. The mixture containing the product of Example 42 in the above-mentioned concentration reduces the drainage time to about 55–65 seconds only.

What is claimed is:

1. A water-soluble to water-dispersible aqueous reaction product of (a) a water-soluble to water-dispersible polymer containing carboxylic acid groups, from an α,β-ethylenically unsaturated carboxylic acid having 3 to 5 carbon atoms; (b) 0.4 to 10 molar equivalents per carboxylic acid group of polymer (a) of at least one 1,2-alkylenimine having 2 to 4 carbon atoms in the alkylene chain and which may be N-substituted by an alkyl, aminoalkyl or hydroxyalkyl group having at most 4 carbon atoms or an acid salt thereof; and (c) 0.4 to 10 molar equivalents per carboxylic acid group of polymer (a) of at least one 1,2-alkylenoxide having 2 to 4 carbon atoms in the alkylene chain and which may be substituted by a hydroxy group, an alkoxy group having at most 4 carbon atoms or a benzene radical, or cyclohexene oxide.

2. A reaction product according to claim 1, wherein polymer (a) is (1) a homopolymer of an α,β-ethylenically unsaturated monocarboxylic acid having 3 to 4 carbon atoms, or (2) a copolymer of an α,β-ethylenically unsaturated carboxylic acid having 3 to 5 carbon atoms, and another α,β-ethylenically unsaturated comonomer.

3. A reaction product according to claim 2, wherein polymer (a) has an intrinsic viscosity in 2 N sodium hydroxide at 25° C. of between 0.30 and 8 dl./g.

4. A reaction product according to claim 3, wherein the carboxylic acid groups of polymer (a) are from acrylic or methacrylic acid.

5. A reaction product according to claim 4, wherein polymer (a) is polyacrylic acid or polymethacrylic acid.

6. A reaction product according to claim 2, wherein polymer (a) is a copolymer of an α,β-ethylenically unsaturated carboxylic acid having 3 to 5 carbon atoms and at least one other α,β-ethylenically unsaturated comonomer.

7. A reaction product according to claim 6, wherein polymer (a) is a copolymer of (I) acrylic, methacrylic or maleic acid and (II) an acrylic acid ester, methacrylic acid ester, acrylamide, vinylether, styrene or vinylpyridine.

8. A reaction product according to claim 1, wherein the alkylenimine (b) corresponds to the formula

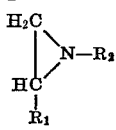

in which $R_1$ is a hydrogen atom or an alkyl radical having at most 2 carbon atoms and $R_2$ is a hydrogen atom, an alkyl, aminoalkyl or hydroxyalkyl radical having at most 3 carbon atoms.

9. A reaction product according to claim 8, wherein the alkylenimine (b) is ethylenimine.

10. A reaction product according to claim 1, wherein the alkylene oxide (c) corresponds to the formula

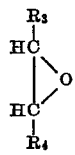

in which $R_3$ is a hydrogen atom, an alkyl radical having at most 2 carbon atoms, a hydroxyalkyl radical having at most 2 carbon atoms, an alkoxy radical having at most 4 carbon atoms or a phenyl radical, $R_4$ is a hydrogen atom or together with $R_3$ is an n-butylene radical.

11. A reaction product according to claim 10, wherein the alkylene oxide (c) is propylene oxide or ethylene oxide.

12. A reaction product according to claim 3 wherein (a) is a polyacrylic acid, (b) is ethylenimine and (c) is propylene oxide.

13. A reaction product according to claim 12 of approximately 1 molar equivalent of ethylenimine and 1 to 2 molar equivalents of propylene oxide.

14. A reaction product according to claim 3 wherein (a) is an acrylic acid-acrylamide copolymer, (b) is ethylenimine and (c) is propylene oxide.

15. Process for the manufacture of a water-soluble to water-dispersible aqueous carboxylic acid polymer-alkyleniminalkylene oxide-reaction product, which comprises heating in an aqueous medium (a) a water-soluble to water-dispersible polymer containing carboxylic acid groups, from an ethylenically unsaturated carboxylic acid having 3 to 5 carbon atoms; (b) 0.4 to 10 molar equivalents per carboxylic acid of polymer (a) of at least one 1,2-alkylenimine having 2 to 3 carbon atoms in the alkylene chain and which may be N-substituted by an alkyl, amino alkyl or hydroxy alkyl group having at most 4 carbons or an acid salt thereof; and (c) 0.4 to 10 molar equivalents per carboxylic acid group of polymer (a) of at least 1,2-alkylene oxide having 2 to 4 carbon atoms in the alkylene chain and which may be substituted by a hydroxy group, an alkoxy group having at most 4 carbon atoms, or a benzene radical, or cyclohexene oxide for 4 to 12 hours at a temperature of 20 to 90° C.

16. Process according to claim 15 wherein polymer (a) is (1) a homopolymer of an α,β-ethylenically unsaturated monocarboxylic acid having 3 to 4 carbon atoms; or (2) a copolymer of an α,β-ethylenically unsaturated carboxylic acid having 3 to 5 carbon atoms, and another α,β-ethylenically unsaturated comonomer.

17. Process according to claim 16, wherein polymer (a) has an intrinsic viscosity in 2 N sodium hydroxide at 25° C. of between 0.30 and 8 dl./g.

18. Process according to claim 17 wherein polymer (a) is a polymer wherein the carboxylic acid groups are from acrylic or methacrylic acid.

19. Process according to claim 18, wherein polymer (a) is polyacrylic acid or polymethacrylic acid.

20. Process according to claim 16, wherein polymer (a) is a copolymer of an α,β-ethylenically unsaturated carboxylic acid having 3 to 5 carbon atoms and at least one other α,β-ethylenically unsaturated comonomer.

21. Process according to claim 20, wherein polymer (a) is a copolymer of acrylic, methacrylic or maleic and an acrylic acid ester, methacrylic acid ester, acrylamide, vinylether, styrene or vinylpyridine.

22. Process according to claim 15, wherein component (b) is an alkylenimine of the formula

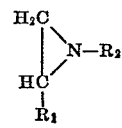

in which $R_1$ is a hydrogen atom or an alkyl radical having at most 2 carbon atoms and $R_2$ is a hydrogen, an alkyl, aminoalkyl or hydroxyalkyl having at most 3 carbon atoms.

23. Process according to claim 22, wherein component (b) is ethylenimine.

24. Process according to claim 15, wherein component (c) is an alkylene oxide of the formula

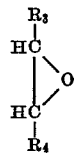

in which $R_3$ is a hydrogen atom, an alkyl radical having at most 2 carbon atoms, a hydroxyalkyl radical having at most 2 carbon atoms, an alkoxy radical having at most 4 carbon atoms or a phenyl radical, $R_4$ is a hydrogen atom or together with $R_3$ is an n-butylene radical.

25. Process according to claim 24, wherein component (c) is propylene oxide or ethylene oxide.

26. Process according to claim 17 which comprises reacting polyacrylic acid, ethylenimine and propylene oxide.

27. Process according to claim 26, which comprises reacting approximately 1 molar equivalent of ethylenimine and 1 to 2 molar equivalents of propylene oxide.

28. Process according to claim 17 which comprises reacting an acrylic acid-acrylamide-copolymer, ethylenimine and propylene oxide.

29. Process according to claim 15 wherein said aqueous mixture is heated for 4 to 6 hours at a temperature between 40 and 50° C.

30. The process according to claim 29, wherein said aqueous preparation is reacted in a second amount of the alkylene oxide.

References Cited
UNITED STATES PATENTS

| | | | |
|---|---|---|---|
| 3,228,823 | 1/1966 | Usala et al. | 260—29.6 HN |
| 3,280,218 | 10/1966 | Endsley et al. | 260—29.6 HN |
| 3,309,331 | 3/1967 | McDowell et al. | 260—29.6 HN |
| 3,386,939 | 6/1968 | Mesec | 260—29.6 HN |

HAROLD D. ANDERSON, Primary Examiner

U.S. Cl. X.R.

162—168; 260—29.6 HN, 29.6 E, 29.6 CM, 78 R, 78 SC, 78 UA